United States Patent [19]

Dixon et al.

[11] Patent Number: 5,024,319

[45] Date of Patent: Jun. 18, 1991

[54] BELT HEATER FOR CONVEYORS

[76] Inventors: Steven C. Dixon, Rte. 3, Box 82D-4; James W. Dixon, Rte. 3, Box 100, both of Oakland, Md. 21550

[21] Appl. No.: 423,014

[22] Filed: Oct. 18, 1989

[51] Int. Cl.⁵ ............................................. B65G 45/00
[52] U.S. Cl. ....................................... 198/494; 34/217; 126/271.2 C
[58] Field of Search ........................ 198/494, 495, 500; 34/207, 217; 37/219; 126/271.1, 271.2 C; 219/385, 386, 388

[56] References Cited

U.S. PATENT DOCUMENTS

| | | | |
|---|---|---|---|
| 1,203,531 | 10/1916 | Givens | 126/271.2 C |
| 3,291,118 | 12/1966 | Wilson | 126/271.2 C X |
| 4,182,444 | 1/1980 | Fisher | 198/497 X |
| 4,739,154 | 4/1988 | Bharara et al. | 219/388 |

Primary Examiner—Joseph E. Valenza
Assistant Examiner—Keith L. Dixon
Attorney, Agent, or Firm—Walter G. Finch

[57] ABSTRACT

A conveyor belt is provided for carrying granular coal or ore from a mine or a crushing station, together with a belt heater in the form of a fuel burner which turns on to melt ice which as formed on the belt at temperatures below freezing. The belt heater heats the conveyor belt surface to a temperature sufficient to melt the ice film to form water and thereby prevent the granular coal or ore from sliding to impair the conveying operation of the conveyor belt or to cause spillage from the conveyor belt. When the conveyor belt stops, the fuel burner stops and thus prevents damage to the conveyor belt. A preferred fuel burner is an oil heater. An infrared heater can also be used but a fuel burner is preferred in flame contact with the belt. The flame of the fuel burner when used in direct contact with the conveyor belt can be immediately shut off when the conveyor belt stops and thereby prevents damage to the conveyor belt. The flame temperature or air temperature reaches a value of at least about 400° C., preferably about 450° C. to 850° C. An electrical system is provided to shut down the fuel burner as soon as the conveyor belt stops. Belt heater is useful even if no ice film is formed on the conveyor belt by heating the hinge or fold area of the folding conveyor belt. An oil burner housing is provided with an air access door to permit debris dropping from the conveyor belt near the flame to be removed.

17 Claims, 3 Drawing Sheets

BELT HEATER FOR CONVEYORS

BACKGROUND OF THE INVENTION

1. Field of the Invention

This invention relates to the field of treating methods and devices for conveyor belts which are used to transport pulverulent material, such as coal or mineral ores, and in particular for treating these conveyor belts to overcome icing under temperatures below freezing as occur during mining and crushing operations during winter weather.

This invention is in the field of treating folding belt conveyors for heating hinge portions of the conveyor belts.

This invention is also in the field of controls for conveyor belts for treating or cleaning devices which coordinate the treatment of the conveyor belt, with the action of the belt treating device, so that a stoppage of the conveyor belt will immediately stop the treatment by the treating device.

2. Description of the Prior Art

It has been proposed in the prior art to clean moving conveyor belts by using steam to dislodge and remove unwanted material, as exemplified in U.S. Pat. No. 1,235,027. Another example of cleaning moving conveyor belts is U.S. Pat. No. 1,793,246 where sticky materials are cleaned from a belt used to convey wet coal.

Vibrators have been used to vibrate the belt and thereby dislodge unwanted material from the belt as illustrated in U.S. Pat. No. 2,873,847.

Proposals have been made to clean dust from conveyor belts used for conveying coal. These proposals include adding liquid treating agents, such as a silicone emulsion from a supply device, as shown in U.S. Pat. No. 4,149,624. Other liquid treating agents have been used such as illustrated in U.S. Pat. No. 4,172,811 and U.S. Pat. No. 4,197,937.

Such proposals are difficult to carry out with flat belts or with configured belts such as trough belts or folding belts of the type shown in U.S. Pat. No. 4,708,906, and U.S. Pat. No. 4,760,913.

U.S. Pat. No. 4,243,136 dicloses treatment of the surface of a coal conveyor belt with an antifreeze solution to prevent icing at locations where the winter temperatures are below freezing. This is similar to the teachings of U.S. Pat. Nos. 4,149,624; 4,172,811; and 4,197,937. U.S. Pat. No. 4,243,136 also provides a temperature sensing electrical circuit which includes a timer and which closes a normally open relay switch when the temperature falls below freezing, 32° F. A coil is energized when the thermostat closes and starts a pump to pump the liquid to a nozzle and to spray antifreeze liquid solution on the conveyor belt and thereby prevent ice from forming on the belt. As long as the thermostat remains closed and the timer operates, the pump will operate. Vibrators have been used to vibrate a belt and thereby dislodge unwanted material from the conveyor belt as illustrated in U.S. Pat. No. 2,873,847.

DISTINCTIONS OF THE INVENTION OVER THE PRIOR ART OF OVERCOMING ICING

The prior art patents do not show the concept of the instant invention of this application of heat either in the form of a fuel flame or hot air at a temperature of at least 400° C., preferably about 450° C. to about 850° C. This heat is applied to a conveyor belt whether of the flat or folded type which have an ice coating thereon to immediately melt the ice to liquid water while the belt is moving and stopping the heating of the conveyor belt when the conveyor belt stops. (Also the prior art patents show heating the hinge portion of a folding conveyor belt to prevent cracking and make the hinge flexible.)

In the use of steam treatment for cleaning as in the U.S. Pat. No. 1,235,027 or in U.S. Pat. No. 1,793,246, the steam will condense on the conveyor belt and will form ice to leave the conveyor belt in the same condition that causes slippage of the coal and thereby render the conveying function of the conveyor belt inoperative.

The use of vibrating devices, such as developed in U.S. Pat No. 2,873,847, has not been effective to completely remove the ice film formed on the belt in the cold winter temperatures used in handling wet coal. Vibrating devices also reduce belt life and cause wear of the belt surface. Also, liquid silicone emulsions or antifreeze solutions are expensive and require expensive disposal operations.

OBJECTS OF INVENTION

It is an object of this invention to provide a heating method and apparatus for eliminating the need for treating solutions and provide immediate ice film melting to water on a conveyor belt without damage to the belt and permit a stop to the heating as soon as the conveyor belt stops.

Another object of this invention is to provide apparatus for overcoming already formed ice on the conveyor belt by applying heat to the surface of the ice bearing conveyor belt.

And even another object of this invention is to provide a control system which includes no temperature sensing thermostat or any time programmed liquid pumping and spraying operation but merely assures safety of heat treatment by cutting off the belt burner as soon as the conveyor belt stops, and by turning on the belt burner again when the conveyor belt starts Still another object of this invention is to provide a system for heating a conveyor belt to overcome ice formation on the belt which is used for conveying granular coal, ore or oil sands from amine or from a coal/ore crushing station during winter weather at temperatures causing ice formation on the belt.

Still another object of this invention is to provide an electrical circuit control means to shut the heating apparatus off is and as soon as the conveyor belt stops to thereby prevent damaging the conveyor belt.

SUMMARY OF THE INVENTION

The invention includes a system for heating the hinged portion of a folding conveyor belt while it is moving under cold weather conditions to make the hinged portion flexible and overcome the stiffness in the rubber material at the hinge which tends to crack when folded at low temperatures.

The preferred heating apparatus of the invention includes a fuel burner, preferably an oil burner, although other fuels may be used in the burner, such as alcohol, gasoline, or mixtures of alcohol and gasoline to provide a flame which impinges on the conveyor belt. Hot air close to the temperature of the oil burner flame may be used interchangeably with the open flame from the oil burner but the flame contact is preferred since it gives direct heat. An infrared heater may also be used but is less preferred because it is more expensive.

If an electrical control system is not used, the heating system may be operated under the control of the operator of the conveyor belt to turn off the burner when the conveyor belt stops. The oil burner is turned on as soon as the conveyor belt is started by the operator and turned off every timme the conveyor belt is stopped by the operator. Obviously an electrical control is preferred.

A preferred fuel burner is an oil burner provided in a novel housing which is fitted with an access door at a side thereof for removing debris falling from the conveyor belt into the oil burner housing. A preferred positioning of the oil burner is one which directs the flame from the nozzle in a direction parallel to the lower travel of the conveyor belt. The flame is in the same direction as the travel of the conveyor belt whereby the upward travel of the open flame inpinges on the surface of the conveyor belt before the conveyor belt reaches the tail roll which drives the belt. Thsi position is preferred for the flat belt conveyor, the trough belt conveyor and the folded belt conveyor as taught in the U.S. Pat. Nos. 4,709,806, and 4,760,913, folded belt conveyors, two oil burners are placed side by side, one below each hinge portion to prevent the hinge from becoming brittle and cracking.

In a second embodiment of the invention, location and positioning of the direct flame contact with the belt, which is applicable only to a flat belt or a trough belt before the belt comes to the coal discharge station or cute, the oil burner and housing include a flame confining conical protector. This protector is used to direct the flame perpendicularly to the surface of the belt so that the oil burner is above the upper travel portion of the belt before the belt reaches the material dumping chute. This location of vertical or prependicular flame inpingement on the empty belt is adapted to those locations where the tail roll is located within a building enclosure. The discharge chute, on the other hand, is located outside of the building and wherein appropriate space permits the positioning of the oil burner adjacent and outside of the building wall and behind the coal chute location.

Broadly, the invention embraces a method for converting adhered ice into water on a conveyor belt for carrying granular coal or ore to immediately melt the ice to water by heating means which may be a fuel burner, a hot air heater or an infrared heater (electrically operated) and also a method and apparatus employing an oil burner flame to warm the fold portions of a folding belt and thereby prevent cracking at the fold of the conveyor belt.

The fuel used for the preferred form of fuel burner may be liquid or gaseous, e.g. oil, gasoline, methanol or natural gas or propane. An infrared heater may also be used.

These and other objects and advantages of this invention will become more obvious and apparent from the following specification and drawings in which:

DESCRIPTION OF THE PREFERRED EMBODIMENTS OF THE INVENTION

Figure 1:
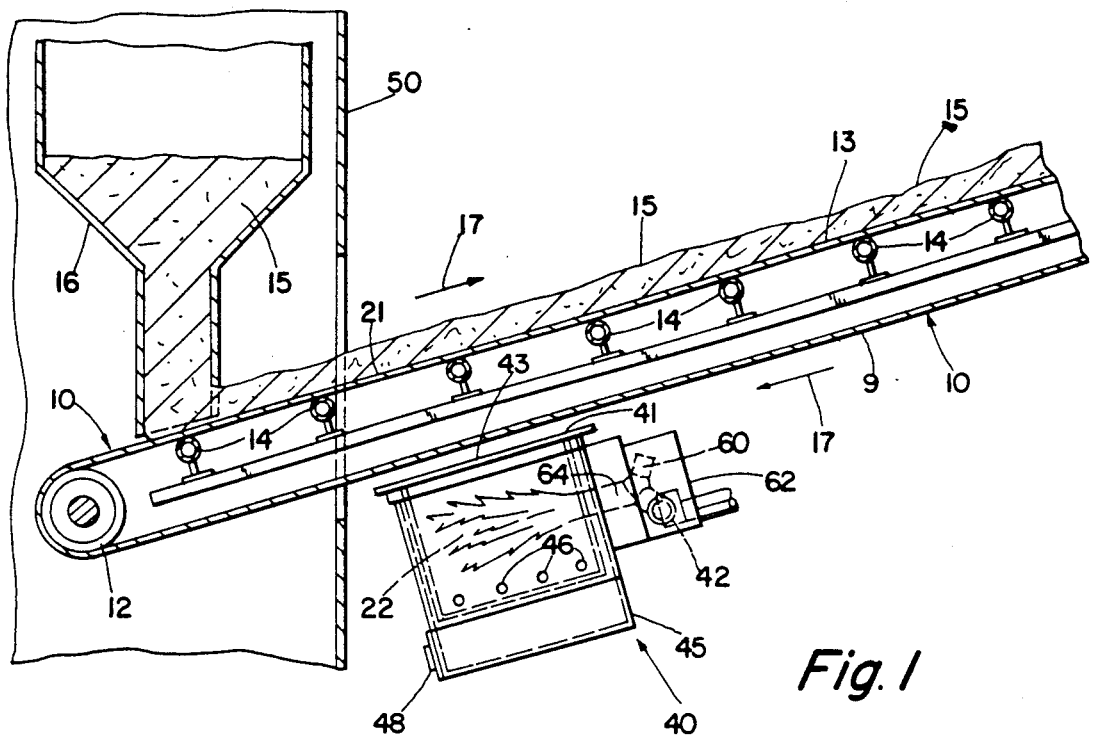
FIG. 1 is a sectional diagrammatic view, in elevation, of a preferred first embodiment of the invention showing a totally outdoor conveying system in which a conveyor belt of a coal conveyor is provided with an oil burner in a novel housing having an open top to form a flame emitting from the nozzle in a direction parallel to the direction of travel of the belt, below the lower run of the belt, and the flame in the same direction as the travel to permit impingement of the flame against the surface of the belt.

In FIG. 1, there is illustrated a first preferred embodiment of the invention in which a portable oil burner 40 delivers a flame 22 in a direction which is parallel to the direction of travel 17 of an endless belt conveyor 10. The oil burner 40 is positioned under the lower reach 9 of the belt conveyor 10 so that the flame 22 can impinge upwardly against the reach 9 of the belt conveyor 10 as it approaches a tail roller 12.

This first embodiment of the invention is specifically provided for an outdoor environment but may also be used in a situation in which a crushed coal chute 16 delivers crushed coal 15 to the top of the upper reach 21 of the belt conveyor 10 in a location upstream of the tail roller 12 and in which the delivery operation of the crushed coal 15 is within a building enclosure which is reached by a wall 50 shown in FIG. 1.

A top of a burner housing 41 is open at 43 of the entire burner housing 41 so that the flame 22 is free to impinge upon the lower reach of the belt surface of the conveyor belt 10.

Figure 2:
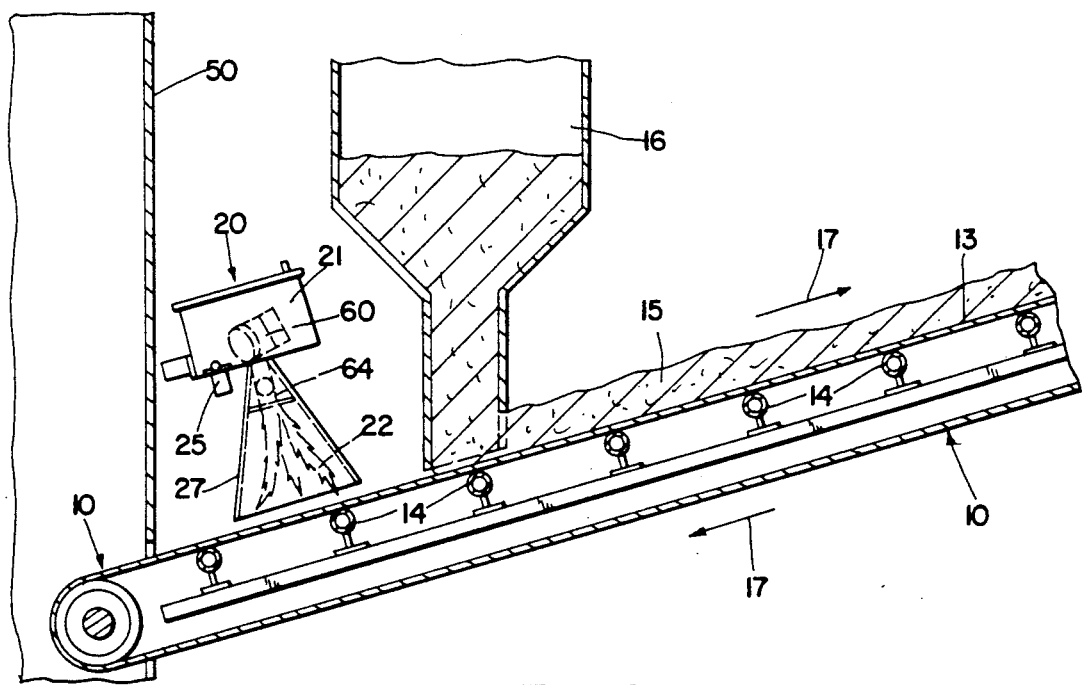
FIG. 2 is a sectional diagrammatic view, in elevation, of a second embodiment of the invention showing a different oil burner than is used in FIG. 1 which is located above the upper travel of the conveyor belt, but with the orientation of the issuing flame from the burner in a vertical direction, perpendicular to the empty surface of the conveyor belt at a location between the tail roll which drives the conveyor belt and the belt loading chute which delivers coal to the conveyor belt, the tail roll being within a building and the oil burner outside of the building.

The details of the novel oil burner housing 41 are set forth in the more detailed description of FIG. 2.

Crushed coal 15 from chute 16 is carried on the belt conveyor 10 which travels over idle rollers 14 to the discharge end of the conveyor belt 10. In the absence of the heating provided by the oil burner flame 22 to impinge on the surface of the conveyor belt 10 in the lower reach or travel of the conveyor belt 10, ice which forms on the belt conveyor 10 would cause the granular coal material to slide backwardly and to build up against the wall 50 thereby defeating the entire conveyor purpose.

Figure 3:
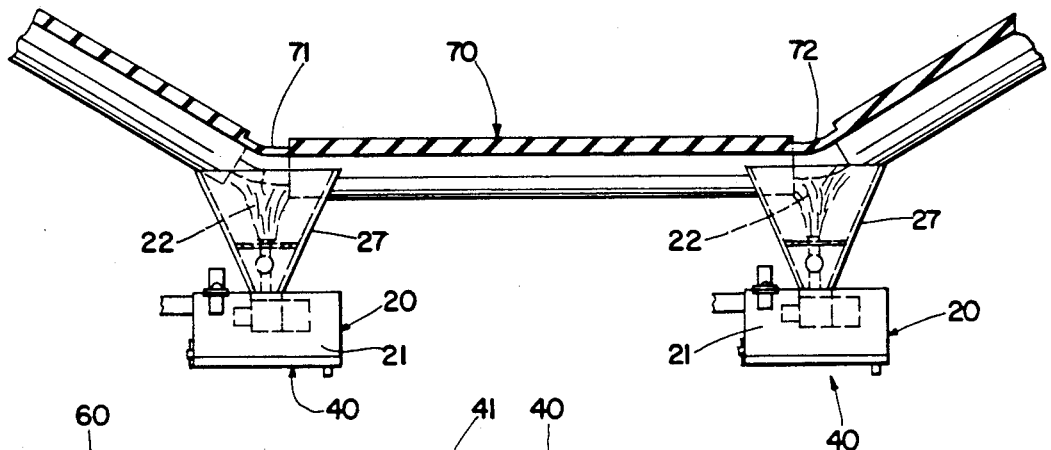
FIG. 3 is a diagrammatic view of a folding belt conveyor of the type used for very steep conveyance, fitted with two spaced oil burners located under the hinge portions of the folding conveyor belt to impart flexibility and prevent cracking.

In this first embodiment of the inventions, the upward tilt of the belt conveyor 10 may vary from an angle of about 5° to about 15° from the horizontal but the use of a folded belt in which a much higher angle is used is achieved in the manner shown in FIG. 3 but in which two oil burner units 40 are located under the hinge portion of the folding belt.

Figure 4:
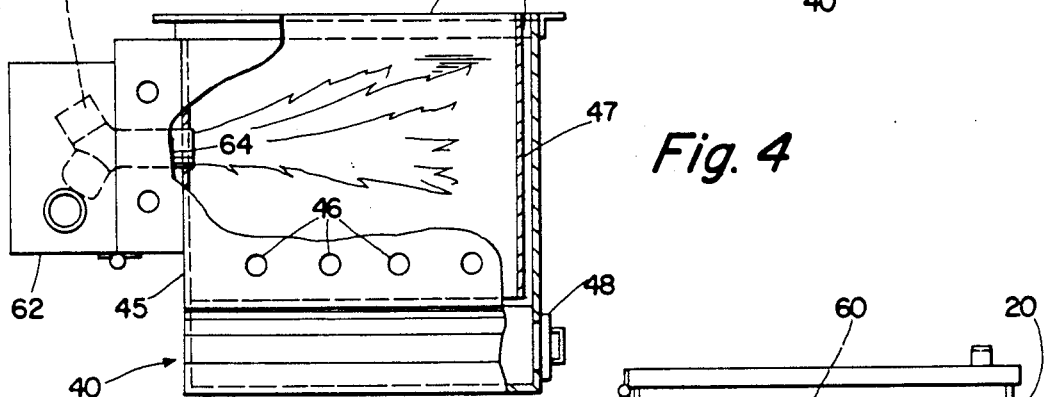
FIG. 4 is an elevational view, partly in section, showing an embodiment of the novel housing and access door construction of the oil burner construction used in FIG. 1, which delivers a flame parallel and below the lower travel of the conveyor belt.

The oil burner housing 41 of FIG. 4 comprises a box-like enclosure having a side wall 45 with an opening for the installation of a commercial oil burner unit 60.

A suitable commercial oil burner unit 60 is readily available under the Trade Name Blue Angel Oil Burner which can be obtained from the Wayne Home Equipment Company, Wayne, Ind., 46803, under Model No. 7-81-C-1.

As noted in FIG. 4 the oil burner 60 is mounted on a mounting plate 62 so that the burner nozzle 64 is positioned upon the side wall 45 of the oil burner housing 41. The front and back walls of the housing are provided with vent holes 46 which permit air to flow from the outside into the interior and aid in guiding the flame 22 in an upward direction for impingement against the belt surface. The interior walls of the oil burning housing 41 are provided with heat deflecting surfaces whereby the heat is concentrated within the housing 41 and is directed to the open top within the periphery of the edge 44.

A second embodiment of the invention is shown in FIG. 2 in which a different embodiment of the oil burner, 20 is used than in the embodiment of the oil burner 40 of FIG. 1. Oil burner 20 consists of a housing which is entirely different from the housing 41 of the oil burner 40 in FIG. 1 and in which the oil burner 20 orients the oil burner unit 60 in an entirely different direction relative to the travel of the conveyor belt 10.

As shown in FIG. 2, the housing of the oil burner 20 comprises two parts, a first box-like enclosure 21 which serves to mount the oil burner 60 and its nozzle 64 in a direction which is perpendicular to the surface of the belt conveyor 10 whereby the nozzle which is mounted withing the box-like enclosure 21 projects into the narrow vertex portion of conical flame deflector 27 so that the flame 22 which is admitted from the nozzle 64 will fan outwardly within the inner confines of the conical deflector 27 to impinge directly upon the surface of the belt conveyor 10.

The top surface 13 of the belt conveyor 10 during cold weather is generally coated with a film of ice. As soon as this film of ice reaches the burner flame 22 which impinges upon the belt conveyor 10, the ice is melted into water in the form of a thin film. As a consequence, crushed coal 15 from chute 16 is delivered to the belt conveyor 10 and there is no slippage of the coal 15 on the belt. The coal 15 travels in the direction 17 of the arrow upon the idler rolls 14, as best shown in FIGS. 1 and 2.

The invention of FIG. 2 differes from the invention of FIG. 1 in that an entirely different housing is employed for the oil burner unit 60 and that the oil burner unit 60 is place in the housing 21 in an entirely different fashion lying wholly within the housing than partially outside.

The belt conveyor 10 of FIG. 2 is especially useful in a belt conveyor system where ample room is provided between the tail roller 12 and the coal material 15 backup location on belt conveyor 10. The heater 20 is in the form of the oil burner housing assembly 21 and 22 used in FIG. 2 avoids having debris extinguishing the flame 22 in comparison with the installation of the oil burner 40 in FIG. 1. Also the belt heater assembly housing 21 and reflector 27 is not adapted to enclosed building areas where conbustible materials are present and wherein the open flame constitutes danger inviting buring or explosion In comparision, as shown in FIG. 4, the oil burner assembly housing consists of oil burner 62, box assembly 40 and opening top member 44 which is susceptible to falling debris or coal 15 from belt conveyor 10. As shown in FIG. 4, an access door 48 is provided in the front of a housing 40 so that coal debris 15 which falls from the conveyor belt 10 into the box-like housing 40 can be cleaned and removed from the housing 40.

Figure 5:
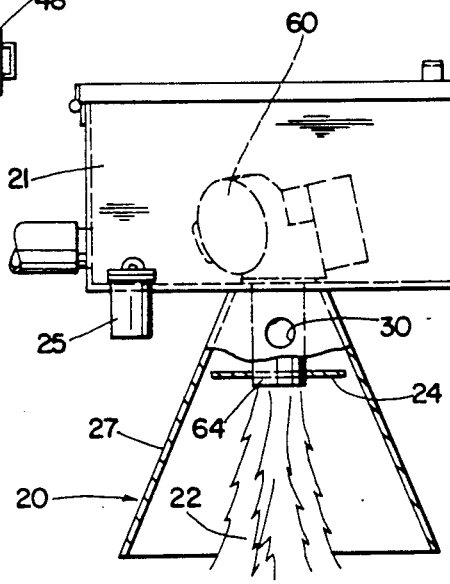
FIG. 5 is an elevational view, partly in section, of a second embodiment of the housing and conical flame protector used in FIG. 2 wherein the flame inpinges downwardly within the flame protector to heat the upper surface of the conveyor belt in a direction perpendicular to the travel of the belt.

The embodiment of the invention shown in FIGS. 1, and 2 with the oil burner housings 40 and 20 shown in FIGS. 4 and 5 respectively, represent combinations of belt conveyor 10 and belt heater 22 in which the flat belt conveyor is used. Conventionally the belt width of such flat belts varies from about 24 inches to about 48 inches. The length of travel, depending upon the scale of mining operations, may be from about 100 yards up to about 500 yards. The speed of the belt conveyor may vary from 60 feet per minute to above several hundred feet per minute. The flame temperature which is achieved in either installation of FIGS. 1 and 2 or in the installation of FIG. 3 in which a folded belt construction is used will provide a flame temperature of about 450° C. up to about 800° C. but the time of contact of the flame 22 and a surface 13 of belt of conveyor 10 is of the order of a few seconds or less.

The fuel burner housing 41 in FIG. 1 has been described above in connection with the detailed description of the flame 22 as applied to the surface 13 of the belt conveyor 10. However, it is noteworthy that the box-like housing 41 of FIGS. 1 and 4, and is provided with a fuel filter 45 which serves to maintain a free flow of oil to the burner nozzle 62. The fuel filter 45 is located at a different location on the housing than fuel filter 25 in FIG. 5.

The fuel filter 25 is located immediately adjacent the incoming fuel feed line and is at a point remote from the fuel nozzle 64 and from the location of impingement of the flame 22 from conical deflector 27.

In contrast to this location the fuel filter 45 in FIG. 1 is located to the left and at the top of the mounting structure for the fuel burner 60. In both housing constructions for the fuel burner 60 the fuel filter 45 is remote from the open flame 22 but the placement of the flame 22 in relation to the belt conveyor 10 is significantly different. This relationship of the filter 45 with respect to the open flame 22 is a significant aspect of the present invention which attempts to provide safety for the critical filtering operation where fuel enters the burner to keep it as far away as possible from the burner flame 22.

In FIG. 3 there is a diagrammatic showing of two burners 40 each identical to the burner 40 in the embodiment shown in the invention of FIG. 1. This combination of fuel burners 40 located under each fold hinge portion 71 and 72, respectively, of folded belt 70 illustrates an adaptation of the heater system of the invention for a belt of the configuration other than the flat belt as illustrated in FIGS. 1 and 2. The belt 70 in FIG. 3 is that which is disclosed in U.S. Pat. Nos. 4,709,806 and 4,760,913. This folding belt conveyor 70 permits conveying operations at very steep anles.

In U.S. Pat. No. 4,760,913, the angle of the belt may be above 45°. These belts 70 in cold weather stiffed at the hinges and under mechanical folding tend to crack. With the two oil burner heating units 40 at each underside of the belt 70 to permit the flame 22 to impinge directly against the surface of the belt 70 at the hinge, thus cracking is overcome without any damage to the belt 70. The open flame has been used to vulcanize rubber compositions but the present heating does not cause any chemical change in in reactive ingredients of the belt 70. Instead, the flame serves to bring the temperature of the belt 70 at the hinge portions 71 and 72 to a value substantially above the winter prevailing temperature and thereby maintains the flexibility of the belt 70 for its intended folding and conveying operation.

Figure 6:
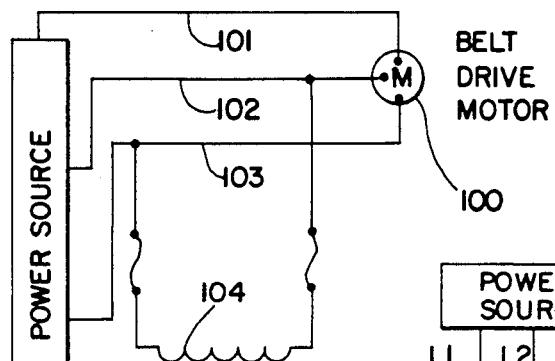
FIG. 6 shows a first embodiment of an electrical circuit for the belt drive motor for the conveyor belt in which the reduced voltage from a step down transformer transforms the three phase 230 or 440 volt A.C. primary to 115 volt A.C. secondary for operating the belt heater and automatic shut down of the belt heater when the conveyor belt drive motor stops.

In FIG. 6 a first embodiment of an electrical circuit is shown in which the electrical circuit automatically controls the shut down of the belt heaters 40 or 20 of FIGS. 1 and 2, respectively, when the motor drive of the belt 70 stops.

In FIG. 6, there is provided a belt drive motor 100 which is fed by a three-phase input voltage of either 230 volts of alternating current or 440 volts of alternating current from the incoming lines 101, 102, and 103 comprising three phases. The belt heater 40 and/or 20 is fed by a step-down voltage from a step-down transformer 104 which is connected at one end and sybolized by H2 to the connector to line 102 and at the other end H1 to the connection at line 103.

The step-down transformer 104 reduces the incoming voltage which is 230 or 440 volts down to 115 volts alternating current. The two electrical lines which operate the ignition of the oil heater 20 or 40 are shown in the curcuit diagram as inputs X1 and X2 of the belt heater 20 and/or 40 respectively. There is a connection from the step-down line of the transformer 104 above X2 to ground as shown by the symbol Gr. This circuit diagram provides for a complete shut-down of belt heater 40 and/or 20 as soon as the drive motor for the belt 70 stops. If the incoming power to the drive motor 100 of the blet conveyor 10 is not three phase high voltage, then a single phase belt drive motor 100 may be used under the same 115 volt alternating current as is used for the belt heater 40 and/or 20.

Figure 7:
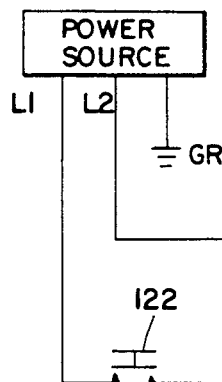
FIG. 7 shows a second embodiment of a electrical circuit for the belt heater which is connected to a 115 volt alternating circuit power source independent of the power source for the conveyor belt and this embodiment comprises an added safety feature of an independent belt slip switch.

A second embodiment of an electrical circuit is shown in FIG. 7 in which the belt drive motor 100 does not require three phase high voltage of 230 or 440 volts, A.C. as in FIG. 6. This circuit is obviously preferred where the belt conveyor 10 is driven from a 115 volt A.C. power source and this circuit includes independent belt slip switch 121 which is provided in a series circuit. The incoming voltage L1 and L2 are at a value of 115 volts A.C. and 60 Hz. is provided with a ground to deliver the current to a manual switch 122 which is closed, then to a belt slip switch 121 then to the belt heater circuit for the oil burner or belt heater 123 and in series is the overload switch 124 for the belt. Only when all of the switches are closed does the oil burner 62, of FIG. 1 operate to deliver its flame to the surface 13 of the surface of 9 of the belt conveyor 10. In the operation of this circuit the belt slip switch 121 operates as the monitor for the belt movement of the belt conveyor 10 and after manual switch 122 is closed the belt heater switch 123 is turned off and the overload switch 124 is closed. If the burner 40 is not turned off but an overload of the belt conveyor 10 occurs then the overload switch 124 opens and then thereafter the belt heater 123 switch also opens to extinguish the oil burner.

Figure 8:
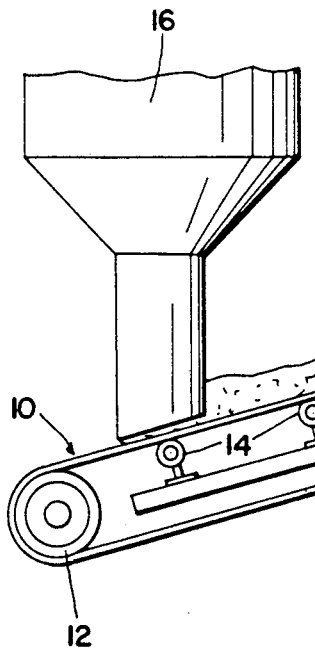
FIG. 8 is a diagrammatic view in elevation of a third embodiment of the belt heater using an infrared heater below the lower travel of a conveyor belt.

In FIG. 8, there is illustrated another embodiment of a heater. It is and infrared heater 50. The positioning of the heater 50 is identical to the positioning of heater 40 in FIG. 1. The infrared heater 50 is available commercially from Fischer Scientific Company under the designation IR-600 Hot Plate Heater which uses infrared electromagnetic radiation instead of induction. The infrared heater 50 is provided with a 30 cm by 30 cm black glass ceramic surface. The temperature of this surface is quickly brought to 615° C. This heater uniformly heats the surface 13 of the belt conveyor 10 and is positioned to immediately convert ice to a film of water as the belt passes over the heater.

Although the fuel for the fuel heaters 20 and/or 40 in FIGS. 1, 2 and 3 is oil, other fuels may be used. Four outdoor application, which is the necessary environment in mining operations, oil is generally most appropriate but under extremely cold temperatures the oil may be diluted with kerosene or gasoline. Gaseous fuels may be used such as methane, ethane, propane, butane, etc. Bottled propane is especially useful. Alcohol may be used such as methanol, ethanol, or propanol.

Mixtures of alcohol and gasoline may be used. It is conventional to modify the fuel burner arrangement so that air and fuel may be adjusted for most efficient burning. Generally operation under field conditions may dictate the nature of the fuel which is employed.

In order to melt ice adhering to the inside of the belt that causes loss of traction on the belt drive roll, a heater may be installed permitting the flame to impringe on the surface of the belt that comes in contact with belt drive roll, thus melting the ice and improving traction.

Obviously many modifications and variations of the present invention are possible in the light of the above descriptions. It is therefore to be understood that within the scope of the jappended claims the invention may be practiced otherwise than as specifically described.

What is claimed is:

1. In combination, a belt conveyor adapted for carrying granular coal or ore from a mine or crushing station which has ice adhering to said belt conveyor, a belt heater means in the form of a fuel burner positioned adjacent said belt conveyor for heating the coal supporting surface of said belt conveyor to a temperature sufficient to melt the ice adhering to said belt surface and to convert said ice to liquid water as long as said belt conveyor is moving and control means to shut off said burner when said belt conveyor stops and which starts said burner when said belt conveyor starts.

2. The combination of claim 1, wherein said fuel burner has a flame temperature of from about 400° C. to about 800° C.

3. The combination of claim 1, wherein said fuel burner is an oil burner, with said burner providing a flame which directly impinges against the belt surface of said belt conveyor.

4. The combination of claim 2, wherein said fuel burner is an oil burner including a plate heated by said burner and placed between about 1 to about 3 inches from said belt surface of said belt conveyor to heat said belt surface thereof through the air space between said burner and said belt conveyor.

5. The combination of claim 1, and a chute for crushed coal, said belt conveyor comprises a tail roller which dirves said belt conveyor from within a building to a discharge end of said belt conveyor outside of said building and said fuel burner is located outside of said building udner said belt conveyor to melt the adhered ice before said belt conveyor enters said building.

6. The combination of claim 1, and a chute for delivering crushed coal to said belt conveyor and wherein said fuel burner is behind said chute and over said belt conveyor.

7. The combination of claim 1, wherein the fuel for said fuel burner is gas.

8. The combination of claim 1, wherein the fuel for said fuel burner is alcohol.

9. The combination of claim 1, wherein the fuel for said fuel said fuel burner is gasoline.

10. The combination of claim 1, wherein the fuel for said fuel burner is a mixture of alcohol and gasoline.

11. The combination of claim 1 wherein the fuel for said fuel burner is methanol.

12. The combination of claim 1, wherein the fuel for said fuel burner is ethanol.

13. The combination of claim 1, wherein the fuel for said fuel burner is propane gas.

14. A method of melting adhering ice on belt conveyor adapted for carrying granular coal or ore from a mine or crushing station, comprising, applying heat to the coal bearing surface of a belt conveyor while said belt conveyor is moving, applying the heat by hot air, a flame, or by infrared radiation at a temperature from about 400° C. to about 800° C., whereby said adhering ice is melted to liquid water as long as said belt conveyor is moving and with said heat being shut off when said belt conveyor stops.

15. A method for maintaining the flexibility at low temperatures of the in-folding sides at the hinge portions thereof of a folding belt on a moving belt conveyor adapted for carrying granular coal or ore, comprising, applying heat to the underside of the hinge portions of said folding belt of said moving belt conveyor, providing a temperature of about 400° C. to about 800° C., with said heat being applied by hot air, a flame, or by infrared radiation whereby the stiffening of the hinge portions at low temperature is overcome by said heating to make said hinge portions flexible.

16. In combination, a folded belt conveyor having a folding belt adapted for carrying granular coal, ore from a mine, or material from a crushing station, and a belt heater mounted for heating the underside of said folding belt at the hinged portions of the unfolded sides of said folding belt while said folding belt is in flat condition and before it is folded inwardly, said belt heater supplying heat by means of a flame, by hot air, or by infrared radiation at a temperature of about 400° C. to about 800° C., whereby the stiffening of the hinge regions of the folding belt, at low temperature is overcome by said heating to make said hinge regions flexible.

17. A combination of claim 16, wherein said belt heater comprises an oil burner, with said heat being applied to said hinge regions by means of a flame from said oil burner impinging directly to said hinge regions.

* * * * *